United States Patent

Smith

[15] 3,645,611
[45] Feb. 29, 1972

[54] PRECISION PLANER POSITIONING MECHANISM

[72] Inventor: Warren H. Smith, Marietta, Ohio
[73] Assignee: Sperry Rand Corporation, New York, N.Y.
[22] Filed: May 6, 1969
[21] Appl. No.: 822,231

[52] U.S. Cl.................................................353/23, 353/27
[51] Int. Cl........................................G03b 1/48, G03b 23/08
[58] Field of Search..........................................353/22, 23, 27

[56] References Cited

UNITED STATES PATENTS

| | | | |
|---|---|---|---|
| 2,534,561 | 12/1950 | Silver | 353/27 |
| 2,701,979 | 2/1955 | Pratt | 353/27 |
| 3,319,518 | 5/1967 | Carlson | 353/22 |
| 3,352,201 | 11/1967 | Brownscombe | 353/27 |
| 3,369,450 | 2/1968 | Peters | 353/27 |
| 3,442,581 | 5/1969 | Smitzer | 353/27 |

FOREIGN PATENTS OR APPLICATIONS 749,839 1/1967 Canada..................................353/22

*Primary Examiner*—Leonard Forman
*Assistant Examiner*—A. J. Mirabito
*Attorney*—Marshall M. Truex, Frank A. Seemar and Griffin, Branigan and Kindness

[57] ABSTRACT

This disclosure describes a precision planer positioning mechanism for positioning a microfiche in an optical viewing or projecting mechanism having a vertical projection axis. The positioning mechanism comprises: a glass plate fixedly mounted in a horizontal plane so that the glass plate intersects the projection axis of the optical system; and, a holder for holding microfiches and moving them through the projection axis. The holder includes nylon or other suitable plastic runners that rest on the glass plate. The runner in combination with the glass plate allow the microfiche to be moved through the projection axis without changing the focal distance between the projection lens and the microfiche as different microfiche images are moved into the projection axis.

2 Claims, 3 Drawing Figures

Patented Feb. 29, 1972

INVENTOR
WARREN H. SMITH

BY *Griffin, Branigan and Kindness*

ATTORNEYS

Patented Feb. 29, 1972

INVENTOR
WARREN H. SMITH

BY *Griffin, Branigan and Kindness*

ATTORNEYS

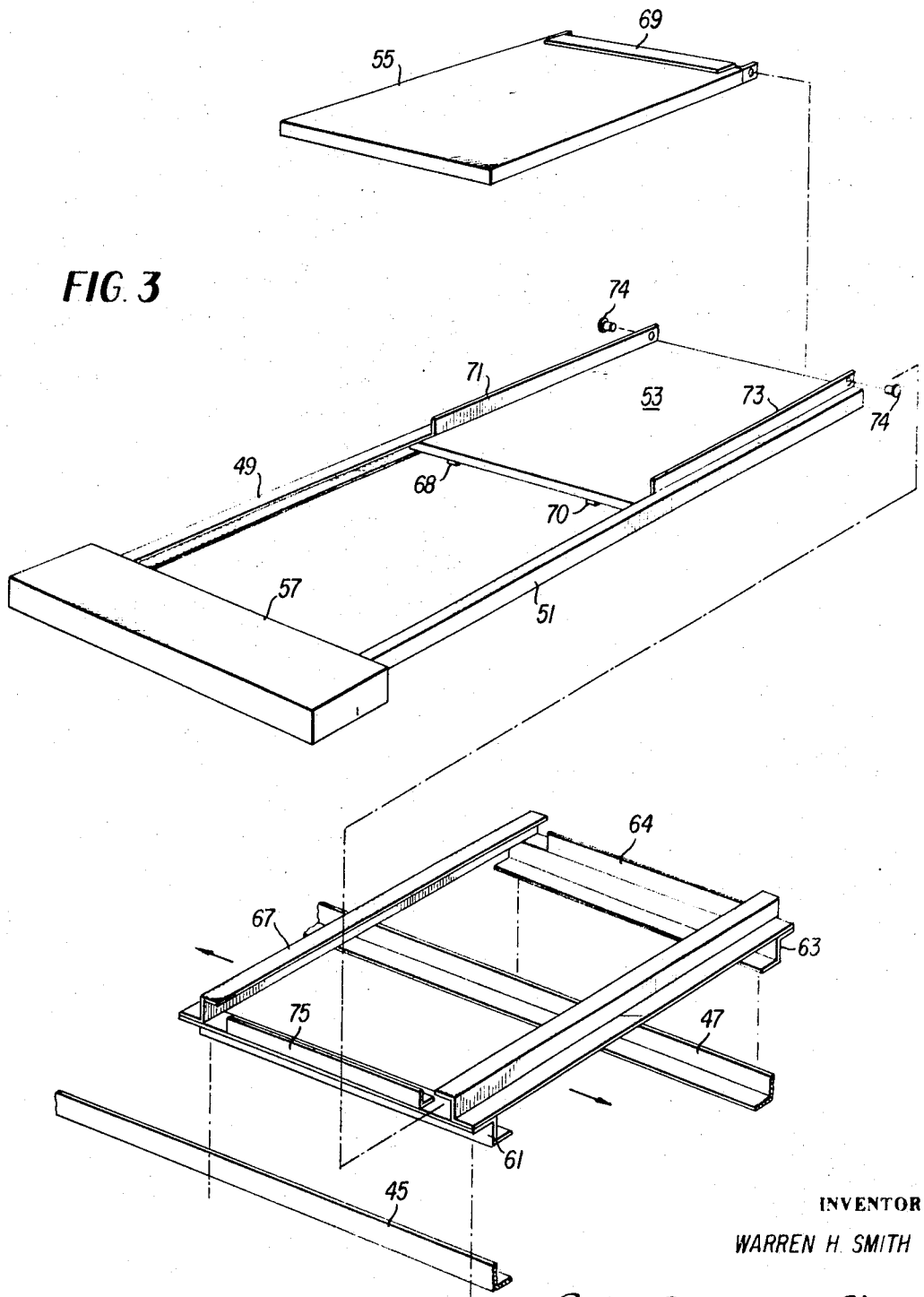

PRECISION PLANER POSITIONING MECHANISM

BACKGROUND OF THE INVENTION

Mechanical and manual systems for positioning the images of a microphotograph in an optical projection or optical viewing system are well known. Also well known are systems for positioning the images of a microfiche in these types of optical systems. A microfiche is actually a photographic film containing multiple microphotographs mounted in a line or matrix arrangement. In general, these systems include an optical projecting system having a vertical projection axis which changes to a horizontal projection axis through the use of mirrors or prisms. The microfiche or microphotograph is held in a holder and moved through the vertical projection axis. Means are provided for varying the distance between the projection lens and the microfiche so that a focused image is projected or displayed.

The basic problem with prior art systems, both manual and mechanical, is maintaining image focus as one image of multiple microphotograph (microfiche) is moved out of the optical axis and another image is moved into the optical axis. Usually, a flat metal plate having an aperture along the projection axis is fixedly mounted over a light source. A projection lens is mounted above the metal plate along the projection axis. A microfiche holder moves over the plate and brings the appropriate microfiche image into the projection axis for projection or display. As previously stated, the basic problem is focusing; that is, each time a new microfiche image is moved into the projection axis, the optical system must be refocused by moving the projection lens with respect to the microfiche image. The reason that refocusing is often required is that the depth of field for the type of optical system necessary to project or display a clear image is very narrow. Hence, any variation in the distance between the microfiche image and the projection lens varies the focus, such as deformation of the flat metal plate, for example. Complex microfiche moving mechanisms have been developed to overcome the focusing problems, however, these systems are too expensive to make them suitable for widespread commercial use.

Another problem of prior art mechanical and manual systems for positioning the images of a microphotograph or microfiche is that the mechanism for moving the microfiche over the plate does not move as easily as desired. For example, some prior art devices include a fabric located on top of the metal plate, which prevents ease of movement over the plate.

Therefore, it is an object of this invention to provide a new and improved apparatus for positioning a microfiche in an optical viewing or projection system.

It is a further object of this invention to provide an apparatus for positioning a microphotograph or microfiche in an optical viewing or projection system that eliminates or reduces the amount of refocusing necessary to provide a clear image.

It is still a further object of this invention to provide a new and improved apparatus for positioning a microfiche in an optical viewing system that maintains a constant relationship between the position of the microfiche and the optical system of the viewing apparatus so as to reduce refocusing of the viewing apparatus, and providing ease of movement of the microfiche holder through the projection axis of the viewing system.

SUMMARY OF THE INVENTION

In accordance with a principle of this invention an apparatus for positioning a microphotograph in an optical viewing or projecting system is provided. The apparatus comprises a glass plate mounted in a horizontal plane so as to intersect the projection axis of the optical system. The apparatus also includes a microphotograph holder mounted so as to rest on the glass plate and moveable through the projection axis of the optical system. The holder includes runner means that rest on the plate and allow ease of movement while aiding in maintaining a constant distance between the location of the microphotograph and the projections lens of the optical system.

In accordance with a further principle of this invention, the runners are formed of nylon or other suitable plastic material and are pressed against the glass plate by suitable means in a slidable manner.

In accordance with a still further principle of this invention, the optical system includes a lamp located beneath the glass plate and a projection lens located above the glass plate and above the microphotograph holder.

In accordance with a still further principle of this invention, the microphotograph is a multiple image microphotograph better known as a microfiche.

In accordance with a still further object of this invention, the holder includes a lower glass plate attached to the runners and an upper glass plate that is hinged with respect to the lower glass plate. The microfiche is held between the two glass plates.

It will be appreciated from the foregoing description that the invention provides an uncomplicated apparatus for moving a microphotograph through the projection axis of an optical viewing or projecting system. Because a glass plate is used and because a holder having runners that slide over the glass plate is maintained fixed with respect to the distance between the holder and the glass plate, refocusing of the optical viewing or projecting system is not often required. That is, because a constant distance is maintained between the microfiche due to the utilization of glass plates (which are not easily deformable) refocusing each time a new image is brought into the optical axis is either greatly reduced or entirely eliminated. Moreover, the system is inexpensive to manufacture and, therefore, suitable for widespread use.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
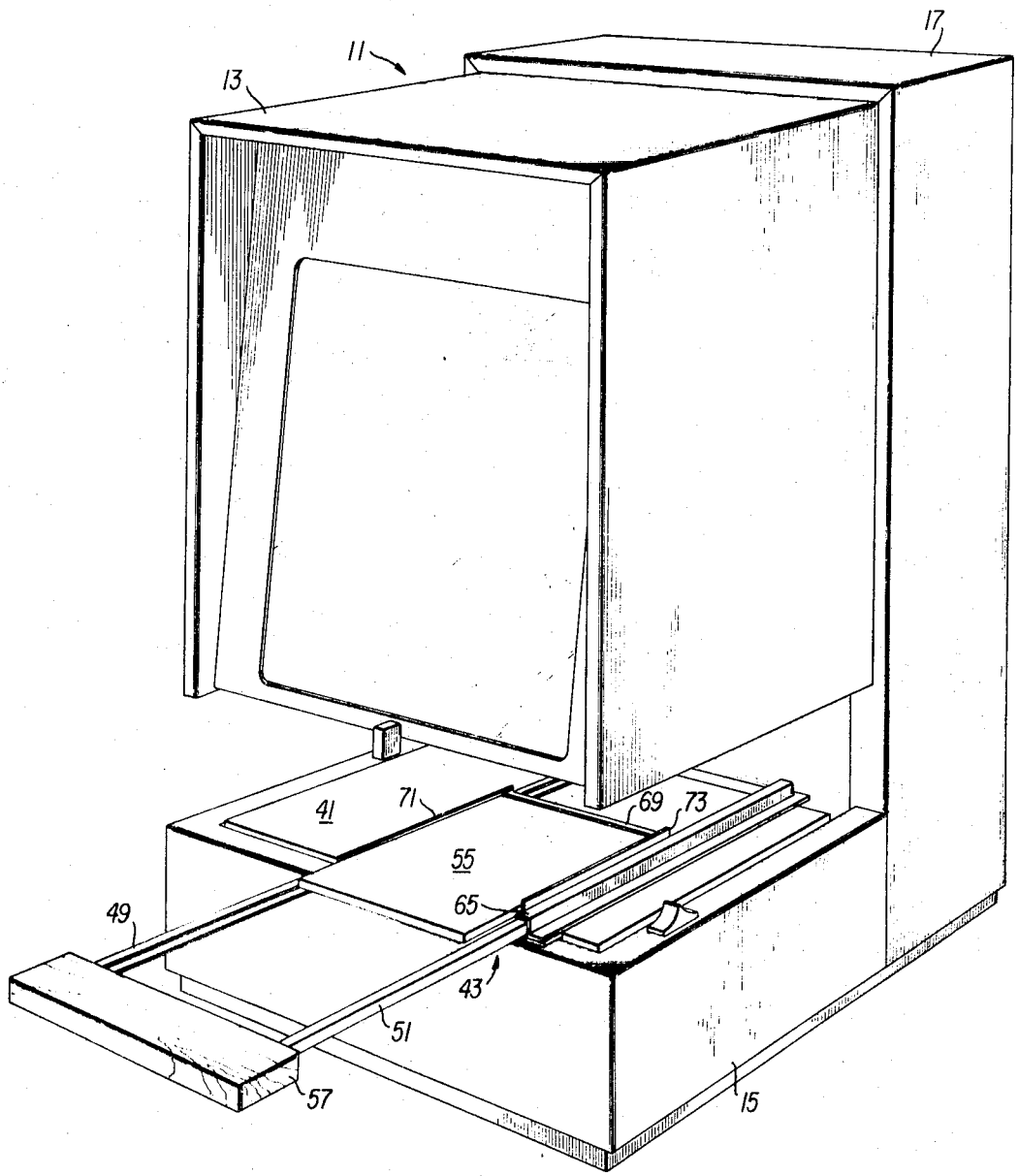
FIG. 1 is a perspective view of the apparatus of the invention mounted in an overhead projector.
Figure 2:
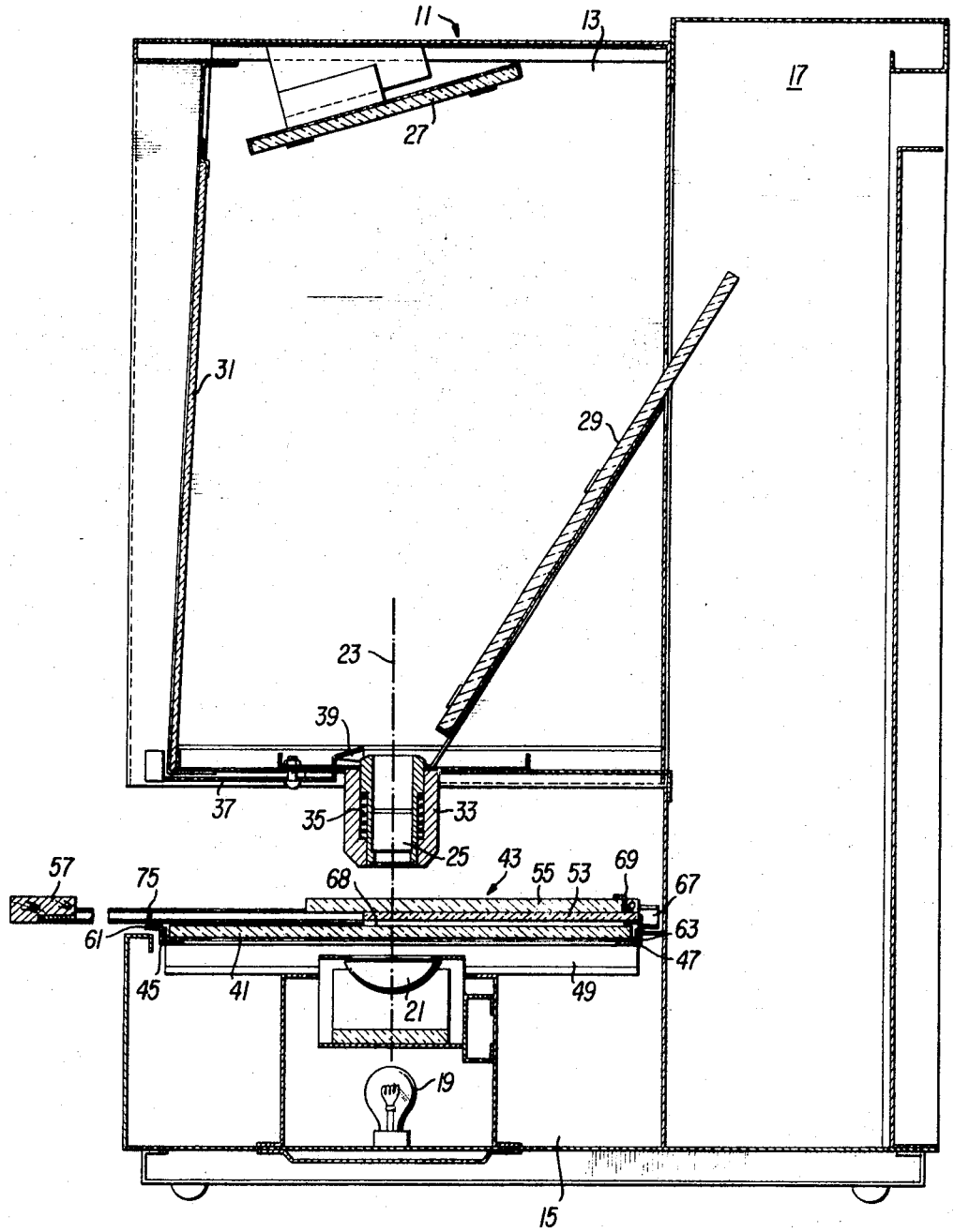
FIG. 2 is a sectional view of the embodiment of the invention illustrated in FIG. 1 along line 2—2; and, FIG. 3 is an exploded view of a microfiche holder suitable for use in the embodiment of the invention illustrated in FIG. 1.

FIGS. 1 and 2 of the drawings illustrate a preferred embodiment of the invention mounted in an overhead projector. The overhead projector illustrated in the figures comprises a housing 11 including an upper section 13, a lower section 15 and a back section 17 all formed of sheet metal, for example. As best illustrated in FIG. 2, the lower section houses a lamp 19 and a condensing lens 21 mounted along a vertical projection axis 23. The upper section 13 and a portion of the back section 17 houses a projection lens 25, a top mirror 27, a back mirror 29 and a front screen 31. The back section holds the upper and lower sections 13 and 15 in a predetermined spaced relationship so that there is an open region between the upper and lower sections. More specifically, the back section 17 holds the upper and lower sections so that the upper section is mounted over the back section and the projection lens 25 located along the projection axis 23. The projection axis intersects the upper mirror 27. The upper mirror 27 projects the projection axis onto the back mirror 29. And, the back mirror 29 projects the projection axis onto the front screen 31. It will be appreciated by those skilled in the art and others that the foregoing description of an overhead projector is merely exemplary of those well known in the art.

The projection lens 25 is mounted in a cylindrical housing 33 which includes a spring 35. An arm 37 having a cam end 39 is adapted to move the projection lens 25 against the spring 35. This movement moves the projection lens toward and away from the lamp 19 and the condensing lens 21 along the projection axis 23. In this manner, focusing of an image located between the condensing lens 21 and the projection lens 25 is accomplished.

Turning now to a description of the embodiment of the invention illustrated in the figures and mounted in the foregoing described overhead projector, the invention comprises a glass plate 41 and a microfiche holder 43. The glass plate is relatively thick, i.e., sufficiently thick so that it does not warp or change shape due to the heat generated in an overhead projection by the lamp 19. The glass plate is horizontally held in a fixed position by resting on a pair of L-shaped brackets 45 and 47. One L-shaped bracket 45 is mounted in front of the glass plate and fixedly attached to the ends of the lower section 17 of the housing 11. The second L-shaped member is mounted in the rear of the glass plate and is also fixedly held in the lower section 15 of the housing 11 at the ends of the housing. The lower portions of the L-shaped members project under the glass 41 to support the glass in a fixed position. Any suitable means may be utilized to attach and retain the L-shaped members 45 and 47 in the lower section 15 of the housing 11, such as the cross support member 49 illustrated in FIG. 2 as mounted along the end wall of the lower section 15 of the housing 11.

The microfiche holder 43 is best illustrated in FIG. 3 and comprises a pair of cross-sectionally U-shaped rails 49 and 51; a lower support glass 53; and upper support glass 55; a handle 57; front and rear carnegie Zee shaped members 61 and 63; and, right and left carnegie Zee shaped members 65 and 67. The front and rear carnegie Zee shaped members 61 and 63 are mounted so that the lower projecting element of the Zee shaped members projects beneath the L-shaped support members 45 and 47. That is, the front carnegie Zee shaped member 61 has its lower element projecting beneath the front L-shaped support 45 and the rear carnegie Zee shaped member 63 has its lower element projecting beneath the rear L-shaped support member.

The right and left carnegie Zee shaped members 65 and 67 are fixedly attached above the front and rear carnegie Zee shaped support members and at right angles thereto so that the lower projecting elements of the right and left carnegie Zee shaped elements are attached to the upper projecting elements of the front and rear carnegie Zee shaped elements. Hence, the four carnegie Zee shaped elements form a rectangle when viewed from the top. The right and left carnegie Zee shaped elements are mounted so that their upper elements project toward each other. The rails 49 and 51 pass over the upper members of the front and rear carnegie Zee shaped members inside of the right and left carnegie Zee shaped members in a sliding manner as illustrated in FIG. 3. The rear carnegie Zee shaped member 63 has a raised section 64 that acts a a rear stop for the rails 49 and 51.

The open sides of the U-shaped rails 49 and 51 face one another and the lower support glass 53 is mounted between the open sides in a fixed manner by a suitable adhesive. A pair of runners 68 and 70 formed of nylon or some other suitably hard plasticlike material parallel the rails are fixedly attached by a suitable adhesive to the lower support glass 53. When the rails are moved inwardly and outwardly or back and forth, as the case may be, the runners slide over the glass plate 41. The foregoing elements are mounted so that the runners 68 and 70 are pressed tightly but slidably against the plate glass while the inward projecting elements of the front and rear carnegie Zee shaped members are pressed against the lower side of their respective L-shaped support elements.

The upper support glass 55 is attached at its rear edge to a hinge bracket 69. The hinge bracket 69 is hinged by pins 74 at its outer ends to upper plate alignment flanges 71 and 73 that project upwardly from the rails 49 and 51 adjacent to the upper glass plate. By this manner of connection, the upper support glass 55, which is preferably longer than (i.e., projects in front of) the lower support glass 53 as viewed in FIGS. 2 and 3 can be lifted so that a microfiche or microphotograph can be inserted between the upper and lower support glasses 53 and 55. Hence, the microfiche is flatly held between the upper and lower support glasses.

The handle 57 is attached to the outwardly projecting rails as illustrated in the figures. In addition, an L-shaped element 75 projects upwardly above the front carnegie Zee element between the rails to aid in alignment. In operation, the handle can be moved inwardly or outwardly with respect to the housing so as to move the microfiche inwardly and outwardly. The runners 68 and 70 slide over the glass plate 41 as the handle is moved. Similarly, the handle can be moved to the right or left causing the holder 43 to move to the right or to the left. Again, the runners slide over the glass plate 41 as the handle is moved. In this manner, an uncomplicated apparatus is provided for moving a microfiche in an overhead projector while maintaining the distance between the microfiche and the projection lens constant. Hence, the requirement for constant refocusing as each new image is brought into the projection axis is eliminated.

The primary reason that the invention eliminates the refocusing requirement common to many prior art machines is the combination of the glass plate 41 and the slide holder 43. The entire structure is pressed together, hence, the overall movement of the microfiche in the vertical direction for movement of the slider is reduced to less than a few ten thousands of an inch. It will be appreciated that utilization of a plate glass 41 in combination with hard plastic (nylon or teflon, for example) runners results in a system having easy movement between the elements and a long lifetime of use. In addition, the addition of a glass plate to the overall structure does not make the optical system any less rugged than prior art systems, because they utilize glass in their mirrors and screens anyway.

It will be appreciated from the foregoing description that a rather uncomplicated apparatus for maintaining a microphotograph or microfiche in a precision planer position is provided. While the apparatus has been described in combination with a manually moving arrangement, it will be appreciated that a mechanical movement mechanism can be combined with the basic inventive structure. In addition, while the invention has been described in an overhead projector environment, it will be appreciated that it could also be used with a projector that projects onto a screen remote from the projector structure.

The embodiments of the invention in which an exclusive property or privileges are claimed are defined as follows:

1. A precision planer positioning mechanism suitable for positioning a microfiche to be displayed in a microfiche optical displaying mechanism that includes a lamp located beneath the microfiche and projection lens located above the microfiche so as to define a vertical projection axis, said precision planer positioning mechanism comprising in combination:

a transparent glass plate fixedly mounted in said microfiche optical display mechanism in a horizontal plane that intersects the vertical projection axis defined by said projection lens and said lamp between said projection lens and said lamp, said transparent glass plate being fixedly held in said microfiche optical displaying mechanism between said lamp and said projection lens by a pair of L-shaped members fixedly mounted in parallel in said microfiche optical displaying mechanism, said L-shaped members having vertically disposed backs and horizontally disposed legs and being mounted so as to face one another, said transparent glass plate lying on the upper surface of said horizontally disposed legs, between said vertically disposed backs; and, a microfiche holder comprising:
an upper transparent glass support plate;
a lower transparent glass support plate, said upper transparent support glass being hingedly attached to said lower transparent support glass along one edge to allow the upper transparent support glass to be raised so that a microfiche can be inserted between said upper and lower transparent support glasses and flatly supported therebetween when said upper transparent support glass is lowered;

a first runner fixedly attached to the lower surface of said lower transparent glass support plate;

a second runner fixedly attached to the lower surface of said lower transparent glass support plate in parallel with said first runner, said first and second runners slidably resting on the upper surface of said transparent glass plate whereby the runners and the upper and lower transparent glass support plates are freely moveable over the upper surface of said transparent glass plate;

a first carnegie Zee shaped member having a projecting element projecting beneath one of said L-shaped members supporting said transparent glass plate toward the other L-shaped member, the other projecting element of said first carnegie Zee shaped member projecting outwardly from said transparent glass plate at approximately the level of the upper surface of said transparent glass plate;

a second carnegie Zee shaped member having a projecting element projecting beneath the other of said L-shaped members supporting said transparent glass plate toward the first of said L-shaped members, the other projecting element of said second carnegie Zee shaped member projecting outwardly from said transparent glass plate at approximately the upper level of said transparent glass plate;

a third carnegie Zee shaped member having a projecting element fixedly attached to the other outwardly projecting elements of said first and second carnegie Zee shaped members at right angles thereto and above said transparent glass plate; and, a fourth carnegie Zee shaped member having a projecting element fixedly attached to the other projecting element of said first and second carnegie Zee shaped members at right angles thereto and above said transparent glass plate, said third and fourth carnegie Zee shaped elements being arrayed in parallel and attached so that their other projecting elements project toward each other, said upper and lower transparent glass support plates being mounted between said third and fourth carnegie Zee shaped members in a slidable manner.

2. A precision planer positioning mechanism as claimed in claim 1 including a pair of U-shaped rails mounted inside of said third and fourth carnegie shaped members beneath the other projecting elements of said third and fourth carnegie Zee shaped members for slidable movement therein, said lower transparent support plate being mounted between said rails, said rails including upwardly projecting flanges at one end that are connected to said upper transparent glass support plate in a hinging manner whereby said upper transparent glass support plate can be raised and lowered with regard to said lower transparent glass support plate, and further including a handle mounted between the other ends of said rails which extend outwardly from said upper and lower transparent glass support plates.

* * * * *